United States Patent
Fleisher et al.

(10) Patent No.: US 12,223,596 B2
(45) Date of Patent: Feb. 11, 2025

(54) TILE THREE-DIMENSIONAL MAPPING TOOL

(71) Applicant: THE NEW YORK TIMES COMPANY, New York, NY (US)

(72) Inventors: Or Fleisher, New York, NY (US); Sukanya Aneja, Brooklyn, NY (US)

(73) Assignee: THE NEW YORK TIMES COMPANY, New York, NY (US)

( * ) Notice: Subject to any disclaimer, the term of this patent is extended or adjusted under 35 U.S.C. 154(b) by 156 days.

(21) Appl. No.: 17/989,416

(22) Filed: Nov. 17, 2022

(65) Prior Publication Data

US 2023/0169729 A1 Jun. 1, 2023

Related U.S. Application Data

(60) Provisional application No. 63/284,766, filed on Dec. 1, 2021.

(51) Int. Cl.
*G06T 17/20* (2006.01)

(52) U.S. Cl.
CPC .......... *G06T 17/20* (2013.01); *G06T 2200/24* (2013.01)

(58) Field of Classification Search
CPC .................. G06T 17/20; G06T 2200/24; G06T 2219/004; G06T 2219/2012; G06T 19/20; G06T 2219/2024; G06T 17/05
See application file for complete search history.

(56) References Cited

U.S. PATENT DOCUMENTS

2006/0170693 A1* 8/2006 Bethune .................. G06T 11/40
345/568

OTHER PUBLICATIONS

Kyle Sinko, "How to Model 3D Site Topography Terrain from Google Earth | Sketchup + Rhino Site Model Tutorial", YouTube video posted on Mar. 24, 2020. https://www.youtube.com/watch?v=8jyc2CFoIKY&t=30s (Year: 2020).*

(Continued)

*Primary Examiner* — Chong Wu
(74) *Attorney, Agent, or Firm* — Rothwell, Figg, Ernst & Manbeck, P.C.

(57) ABSTRACT

Embodiments disclosed herein mitigate technological barriers in preparing, sourcing, and exporting 3D assets with practical applications for journalism. According to one embodiment, a computer-implemented method for generating a three-dimensional map is provided. The method includes displaying a two-dimensional region of a map on a graphical user interface (GUI), wherein the map is displayed along longitudinal axis and a latitudinal axis. The method includes obtaining, through the GUI, a first input from a user device, the first input comprising an indication of a selected sub-region of the two-dimensional region of the map, wherein the selected sub-region comprises a plurality of pixels having longitudinal coordinates bounded by a first longitude coordinate and a second longitude coordinate along the longitudinal axis and latitudinal coordinates bounded by a first latitude coordinate and a second latitude coordinate along the latitudinal axis. The method includes obtaining, from a first data source, elevation coordinates along a lateral axis corresponding to the longitudinal coordinates and the latitudinal coordinates for each of the plurality of pixels. The method includes generating a three-dimensional mesh of the selected sub-region, wherein the three-dimensional mesh comprises a plurality of vertices corresponding to the elevation coordinates, the longitudinal coordinates, and the latitudinal coordinates of the plurality of pixels and a plurality of edges connecting the vertices. The method includes displaying the three-dimensional mesh on the GUI.

20 Claims, 9 Drawing Sheets

(56) References Cited

OTHER PUBLICATIONS

TheSketchUpEssentials, "Modeling Sliced Terrain from Location Data in SketchUp with Joint Push Pull and Slicer", a YouTube video posted on Dec. 12, 2017. https://www.youtube.com/watch?v=-Pxl0pjOkW0 (Year: 2017).*

Peter Liu, "LandGrab" (Nov. 2019), date accessed Nov. 17, 2022, available at https://peterqliu.github.io/pieces/landgrab/#-76.679375,-77.292613,39.028714,38.755972; 1 page.

* cited by examiner

TILE THREE-DIMENSIONAL MAPPING TOOL

CROSS-REFERENCE TO RELATED APPLICATIONS

This application is a non-provisional of, and claims the priority benefit of, U.S. Prov. Pat. App. No. 63/284,766 filed Dec. 1, 2021, which is hereby incorporated by reference in its entirety.

TECHNICAL FIELD

Aspects of the present disclosure relate to digital tools to select, edit, and export three-dimensional ("3D") maps as 3D assets for use in applications such as augmented reality ("AR"), virtual reality ("VR"), and 3D storytelling.

BACKGROUND

Maps are a vital part of news reports, and entities have developed capabilities to find, annotate, and customize two-dimensional ("2D") maps relatively quickly.

Reader demand has increased for 3D content for use in AR, VR, mixed reality ("MR"), and other 3D storytelling applications. Data providers and certain applications allow users to find, annotate, and customize 3D maps, such as Mapbox and OpenStreetMap. Geospatial data providers have also added features to maps to enable 3D views.

SUMMARY

Current data providers make it rather complex to source and prepare 3D assets, which prevent the wider use of 3D assets in breaking news and fast turn-around stories. Moreover, it is not always feasible nor desirable to include a fully-functioning map in a web or mobile story where bandwidth, processing, and other computing resources may be constrained.

Aspects of the present disclosure relate to a web-based application called Tile that addresses these problems by allowing for a way to author and export small 3D sections of maps. Tile allows journalists and other users to quickly and efficiently create 3D maps in an intuitive way while leveraging multiple data sources, such as Mapbox and OpenStreetMap. Tile makes it easy to source, style and export delivery-optimized 3D map tiles for any location, which can be used in a variety of applications. For example, the exported 3D map tiles may be used in web-browser based applications using WebGL, Spark AR, and other 3D and video storytelling formats.

According to one aspect, a computer-implemented method for generating a three-dimensional map is provided. The method includes displaying a two-dimensional region of a map on a graphical user interface (GUI), wherein the map is displayed along longitudinal axis and a latitudinal axis. The method includes obtaining, through the GUI, a first input from a user device, the first input comprising an indication of a selected sub-region of the two-dimensional region of the map, wherein the selected sub-region comprises a plurality of pixels having longitudinal coordinates bounded by a first longitude coordinate and a second longitude coordinate along the longitudinal axis and latitudinal coordinates bounded by a first latitude coordinate and a second latitude coordinate along the latitudinal axis. The method includes obtaining, from a first data source, elevation coordinates along a lateral axis corresponding to the longitudinal coordinates and the latitudinal coordinates for each of the plurality of pixels. The method includes generating a three-dimensional mesh of the selected sub-region, wherein the three-dimensional mesh comprises a plurality of vertices corresponding to the elevation coordinates, the longitudinal coordinates, and the latitudinal coordinates of the plurality of pixels and a plurality of edges connecting the vertices. The method includes displaying the three-dimensional mesh on the GUI.

In another aspect there is provided a device adapted to perform the method. In another aspect there is provided a computer program comprising instructions which when executed by processing circuity of a device causes the device to perform the method.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION

The embodiments disclosed herein for Tile, a 3D mapping applications, provide a number of improvements to prior systems and techniques for the selection, generation, and exportation of 3D map assets for use in a wide variety of applications. For example, Tile allows for increased user controls for map area selection using latitude/longitude coordinates and zoom. Tile provides greater customization of 3D assets, leveraging a variety of imagery providers (e.g., Mapbox, OpenStreetMap, etc.) and supporting different imagery style (satellite, streets, etc.). Tile allows for easy visualization and simplification of a 3D asset, and provides further customization that allows users to adjust a map tile size and add side walls for space-constrained applications, such as for augmented reality stories. Tile provides the ability to layer contextual data as part of the 3D asset. Tile provides editor tools to add markers and labels to assets. Tile provides features and customization that make 3D content and assets optimized for AR and other applications. Tile provides export options for a variety of endpoints, with helpful information about the asset pre-download to inform the level of detail of the asset. Moreover, the Tile application provides automations to speed up workflows in common scenarios. Accordingly, Tile provides technical solutions to technical problems arising in AR, VR, and other interactive or immersive experiences relating to 3D asset selection, creation, and exportation.

Figure 1:
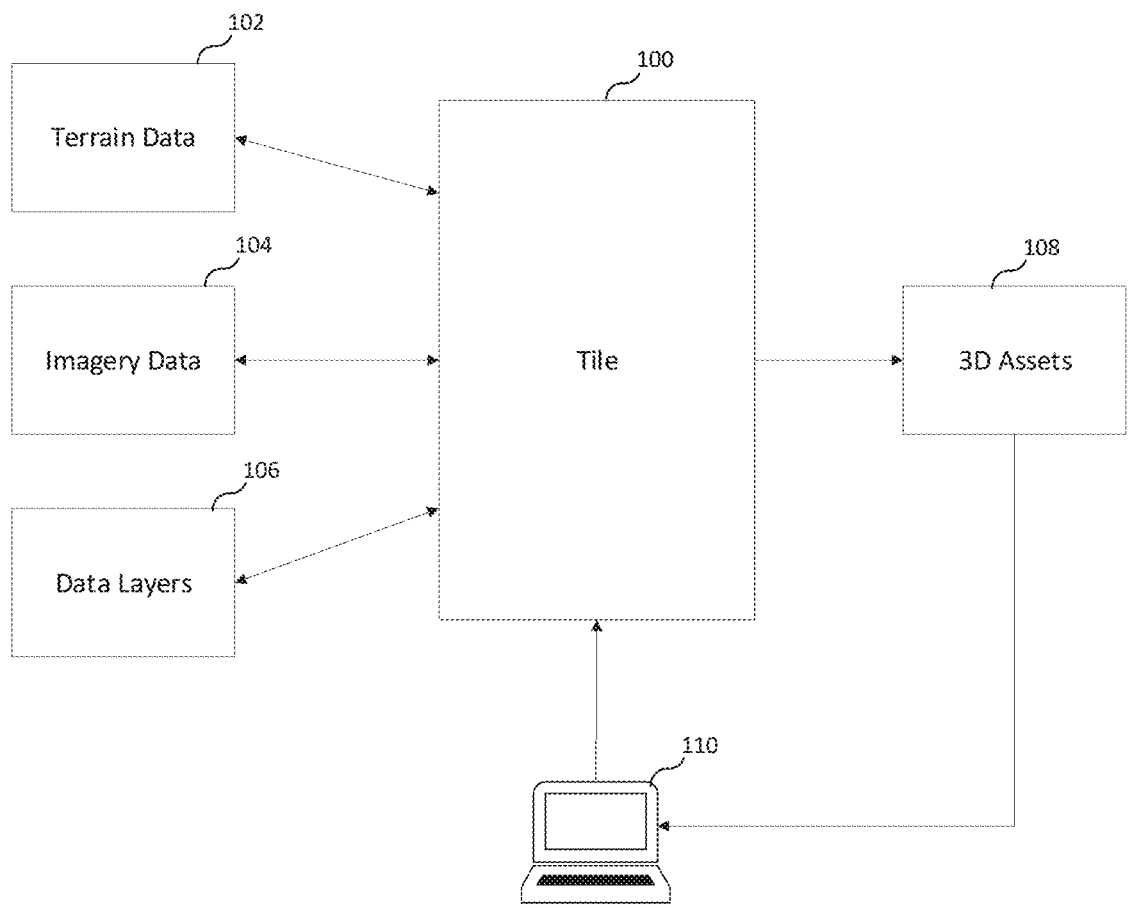
FIG. 1 is a block diagram, according to some embodiments.

FIG. 1 is a block diagram, according to some embodiments. FIG. 1 illustrates an architecture of a Tile system, including a Tile application server or device 100 supporting the modules described herein. The Tile application server 100 may be in electronic communication with one or more data sources pertaining to map data, including data sources 102, 104, and 106. For example, the server 100 may obtain terrain data pertaining to a geographic region from a public or non-public data source 102, such a geospatial data source. The server 100 may obtain imagery data from one or more data sources 104, such as Mapbox, OpenStreetMap, or other data sources. In addition, the server 100 may obtain data layers, such as Keyhole Markup Language (KML) data or GeoJSON annotations from one or more data sources 106. In some embodiments, server 100 may interface with one or more endpoints of data sources 102, 104, and 106 via an application programming interface (API), or other suitable interface, over a network such as the Internet.

One or more user devices 110 may be in electronic communication with the Tile server 100 over a network, such as the Internet, through a network interface. In some embodiments, user device 110 may be a laptop, desktop computer, mobile device, tablet, or other computing device. In the embodiments disclosed herein, user device 110 comprises a display capable of displaying a user interface generated by the Tile server 110. In some embodiments, the user interface is a graphical user interface (GUI) that may be displayed in a window of browser application, desktop application, or mobile application running on user device 110. A user operating user device 110 may be able to transmit one or more commands to server 100 using one or more interactive elements displayed in the GUI, such as text boxes, check boxes, slider bars, buttons, selection areas, and the like.

In some embodiments, the server 100 may output 3D assets 108 created by the server 100. The 3D assets 108 may be transmitted to the user device 110, or to another device.

Tile server 100 hosts several modules for facilitating the selection, creation, and generation of 3D assets. In some embodiments, these modules may provide one or more of the following features, described in further detail below and in connection with the accompanying drawings: map region selection, elevation data, 3D mesh generation, mesh simplification, wall generation, textures, mesh customization, annotations, mesh export, and automations.

Figure 2:
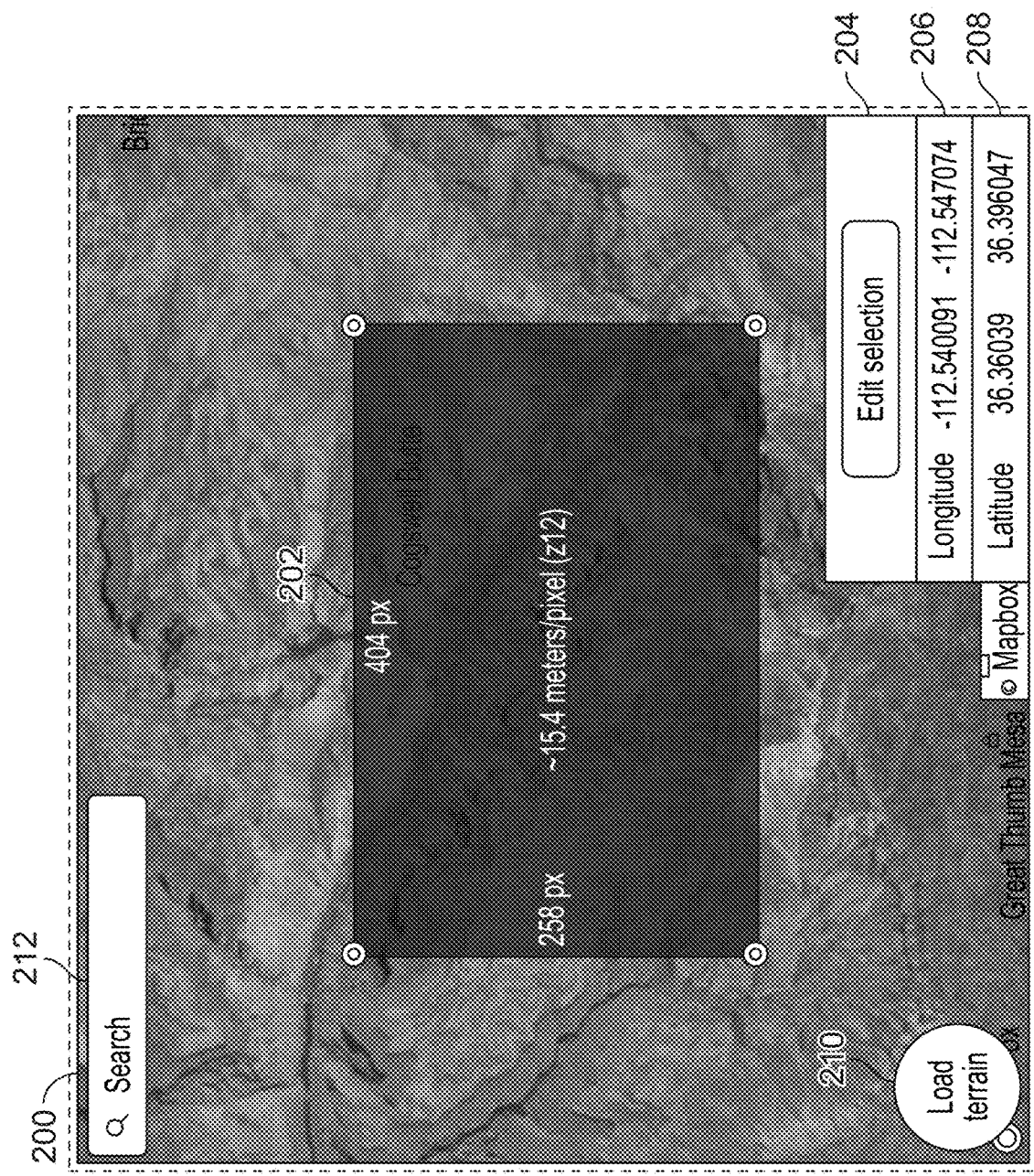
FIG. 2 is a screen capture of a graphical user interface, according to some embodiments.

FIG. 2 is a screen capture of a graphical user interface, according to some embodiments. In some embodiments, screen 200 is generated by sever 100 and displayed in a GUI on a display of user device 110. Screen 200 may include a search input bar 212 that a user may use to identify and search for an appropriate map for a geographic location.

FIG. 2 further illustrates a map region selection feature of the application.

Map Region Selection

Tile allows for a user to select a section of a 2D map from which to generate a 3D asset. In some embodiments, the 2D map may span a longitudinal and latitudinal axis across the screen. A user may use click-and-drag functionality to draw a rectangular region on a map 202 corresponding to selected longitudinal and latitudinal coordinates. In some embodiments, a user may edit a selected region, or select a region, using selection input area 204 for inputting latitude 208 and longitude ranges 206.

Elevation Data

At 210, the user may select an interactive element 210 to load the terrain and obtain elevation data corresponding to the selected region. The elevation data for the selected region may be gathered by querying one or more APIs from the data sources 102, 104, and/or 106. In some embodiments, the data sources may include Mapbox or OpenStreetMap, or a geospatial data source. In some embodiments, elevation data may be accessible at different sources, and a user may be able to select one or more sources from which to collect the elevation data.

FIGS. 3-7 are screen captures of a graphical user interface, according to some embodiments. In some embodiments, screens 300, 400, 500, 600, and 700 are generated by sever 100 and displayed in a GUI on a display of user device 110. Each screen is described in further detail below to highlight different features of the Tile application and the generated GUI.

3D Mesh Generation

Figure 3:
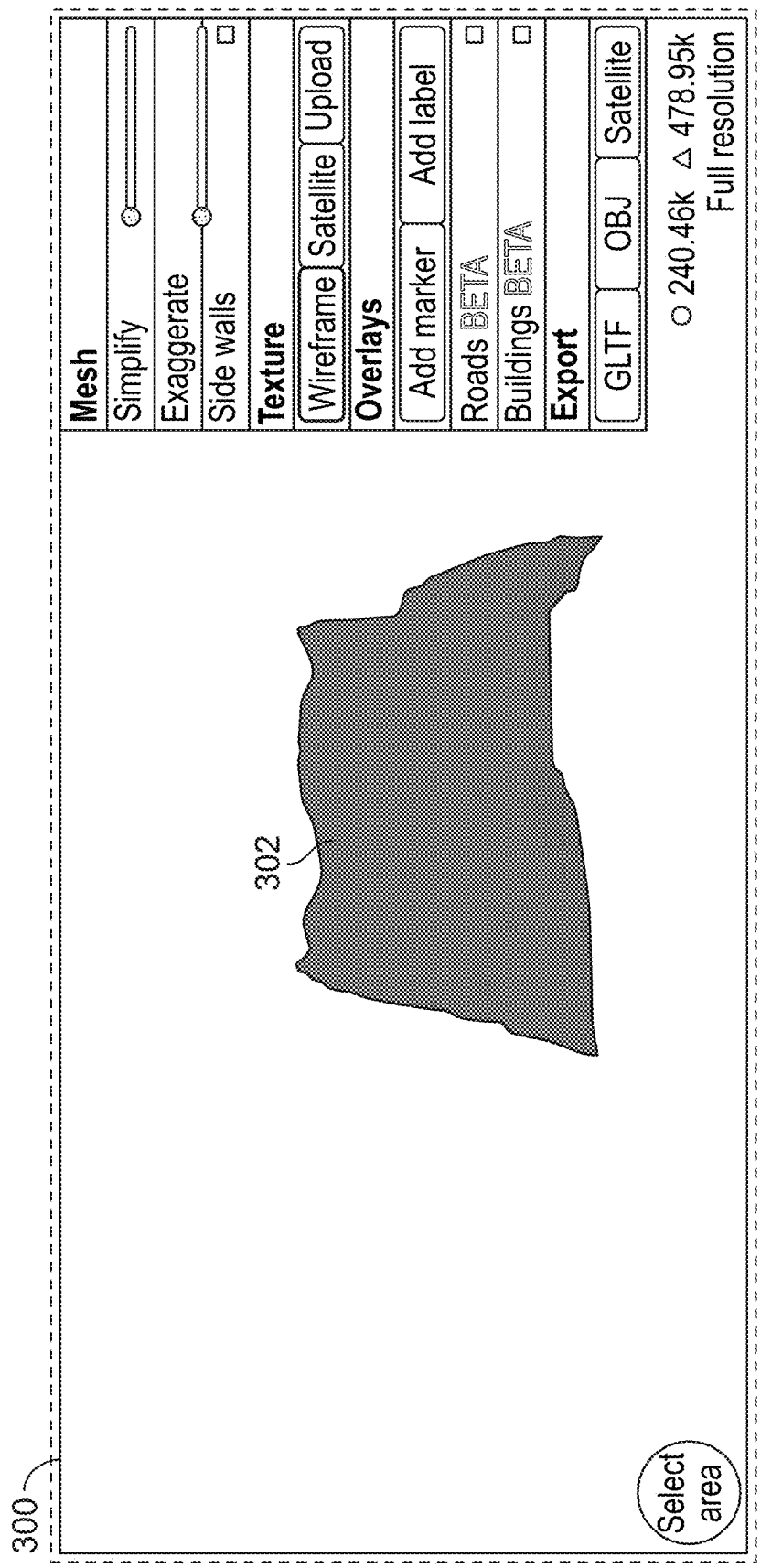
FIG. 3 is a screen capture of a graphical user interface, according to some embodiments.

FIG. 3 illustrates 3D mesh generation functionality of the Tile server 100. The obtained elevation data is used to generate a 3D mesh. An example 3D mesh of the selected section of the map is illustrated as element 302 in FIG. 3, as well as elements 402, 502, 602, and 702 in FIGS. 4-7. In some embodiments, the 3D mesh is generated using three.js and react-three-fiber. The data mesh may be generated using a per-pixel elevation that corresponds to the 2D map region selected, and the mesh is created to match this pixel density.

Textures

Figure 4:
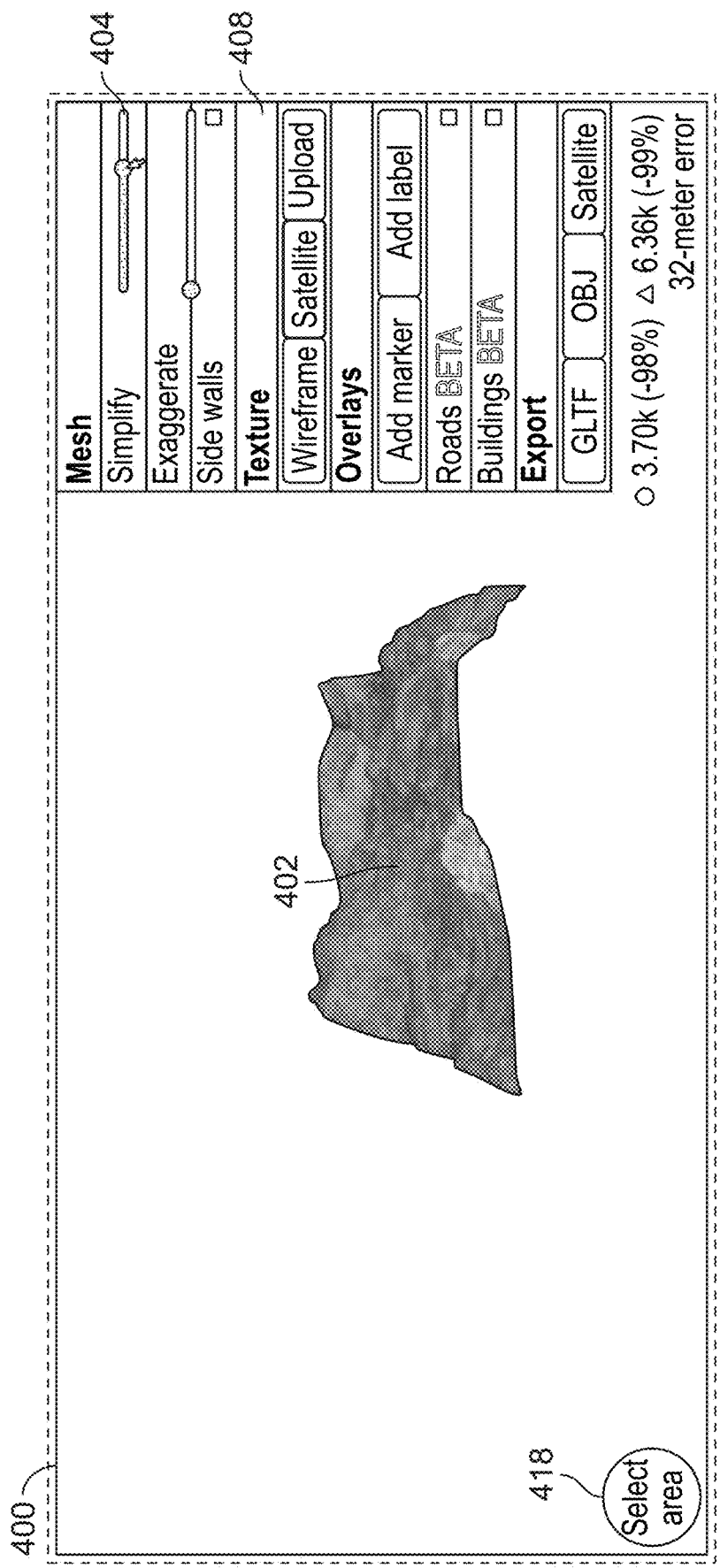
FIG. 4 is a screen capture of a graphical user interface, according to some embodiments.

FIG. 4 illustrates textures functionality of the Tile server 100. The texture of the terrain corresponding to the selected map section can be fetched from a number of data sources. For example, the terrain information may be selected from one or more geospatial APIs, such as Mapbox, OpenStreetMap and more. In some embodiments, the texture tool 408 may be displayed on the GUI and allow for fetching any variation of the terrain that is provided by these data sources, such as terrain information for street maps, satellite imagery, custom styled imagery, and more. In the example screen 400 shown in FIG. 4, a user may select satellite texture using the texture tool 408, which will update the data mesh 402 to reflect the satellite texture.

Mesh Simplification

FIG. 4 also illustrates mesh simplification functionality of the Tile server 100. In some embodiments, the resultant mesh can be fairly heavy (e.g., large) and not ideal for certain delivery platforms such as AR. Additionally, the level of detail provided by the elevation data may not always be required. For example, a fairly flat region may have similar elevation at all points, and would have a visually similar result to a sparser mesh. To simplify the mesh, one or more tools may be used to flatten a region. In some embodiments, an open source library such as Delatin may be used to employ Delaunay Triangulation to 'flatten' regions in the 3D mesh 402 with elevation within a given threshold. In some embodiments, the GUI may display an interactive mesh simplification tool 404, which may allow a user to specify a degree to which the 3D mesh should be simplified. The amount of simplification may be indicated using a slider bar, or a user may input a percentage, e.g., on a scale of 0-100%. In some embodiments, simplification of the mesh may further optimize the mesh for use and display in certain applications, particularly for web browsers and resource-constrained applications.

Mesh Exaggeration

Figure 5:
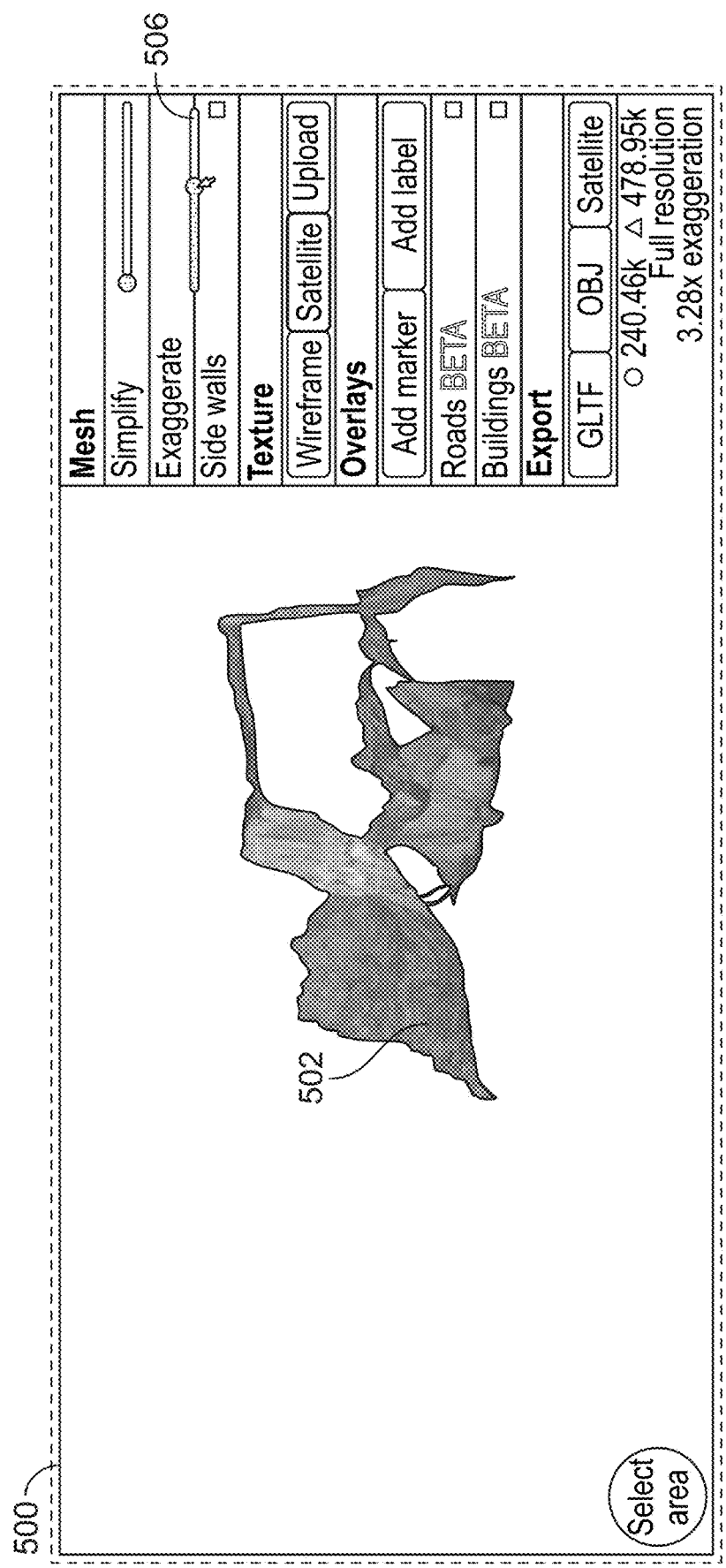
FIG. 5 is a screen capture of a graphical user interface, according to some embodiments.

FIG. 5 illustrates mesh exaggeration functionality of the Tile server 100. In some embodiments, the generated mesh terrain can be customized by specifying the level of simplification as discussed above, as well as elevation exaggeration. FIG. 5 illustrates a screen capture 500 illustrating the exaggeration tool 506. A greater degree of exaggeration may distort and highlight differences in elevation in the 3D mesh 502, as illustrated in FIG. 5. The amount of exaggeration may be indicated using a slider bar, or a user may input a percentage, e.g., on a scale of 0-100%.

Wall Generation

Figure 6:
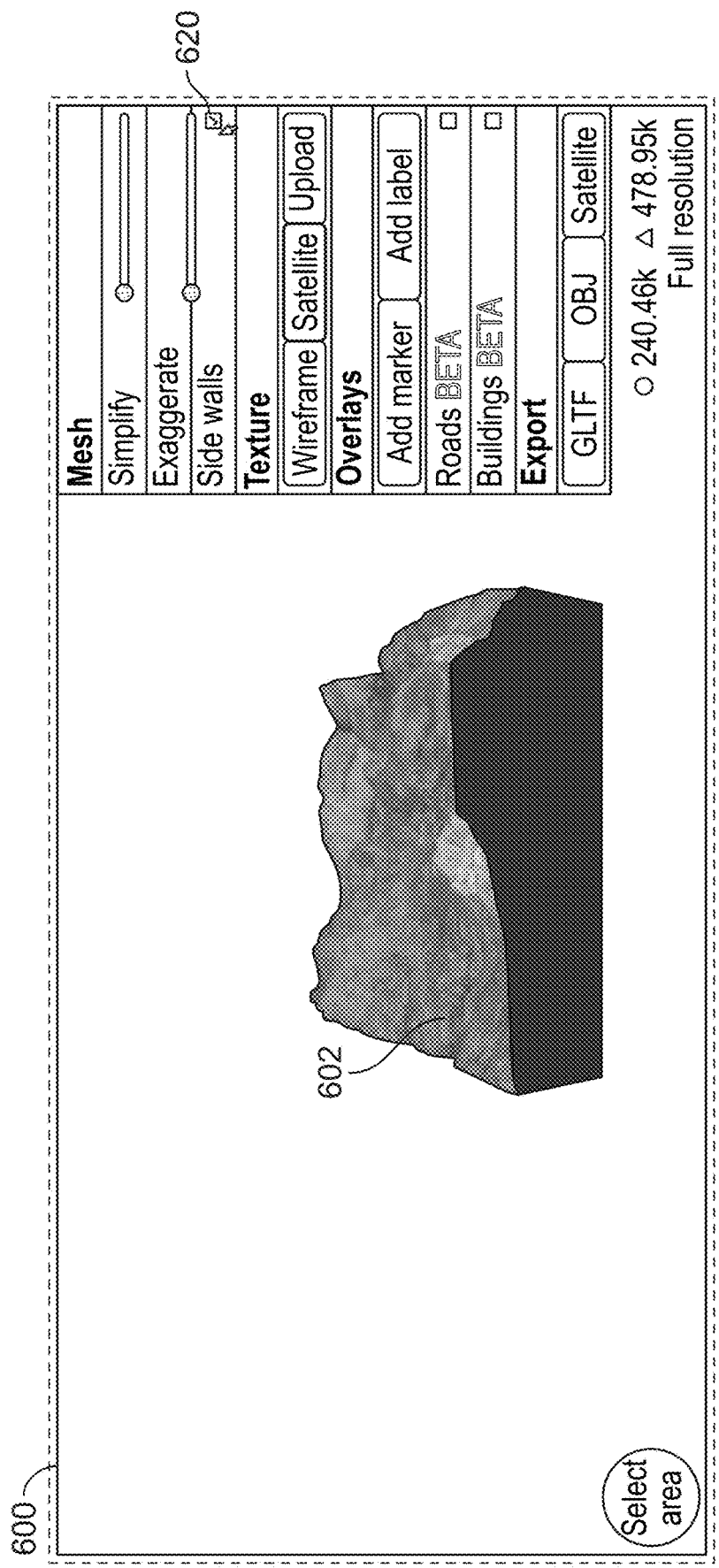
FIG. 6 is a screen capture of a graphical user interface, according to some embodiments.

FIG. 6 illustrates wall generation functionality of the Tile server 100. In some embodiments, the generated 3D mesh of the selected map region may appear as a "floating" terrain surface with no height. To provide context on the level a selected terrain exists from sea level, or from another predetermined elevation, additional meshes may be constructed to create "walls" on all sides of the terrain mesh. FIG. 6 illustrates a screen 600 with a side wall tool 620. A user may interact with the side wall tool 620 in order to indicate whether one or more walls should be created on the 3D mesh, at what height the walls should be created from, etc. The data mesh 602 in screen 600 illustrates the creation of walls on the 3D data mesh from sea level when the wall generation tool 620 is activated.

Annotations

Figure 7:
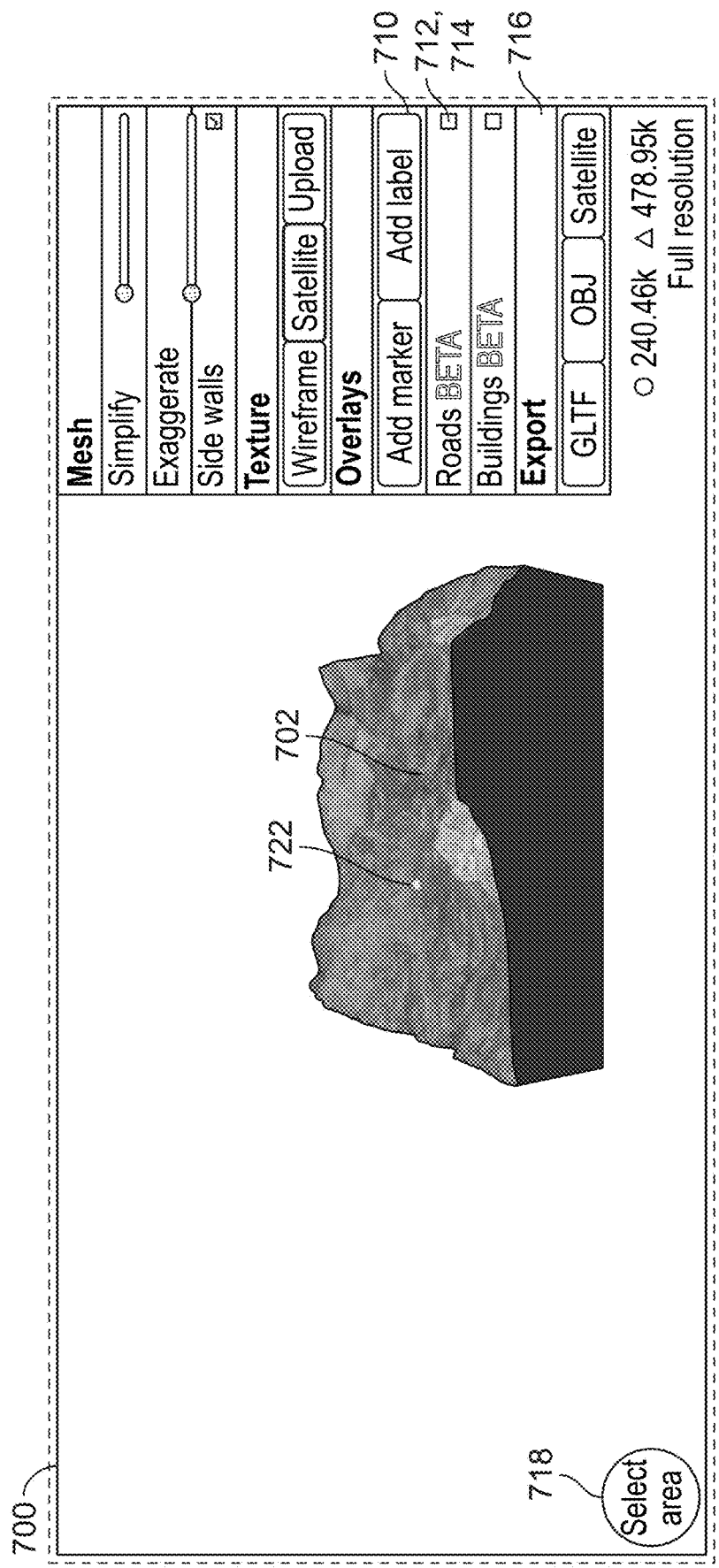
FIG. 7 is a screen capture of a graphical user interface, according to some embodiments.

FIG. 7 illustrates annotation functionality of the Tile server 100. In some embodiments, annotations can be added to the 3D mesh. For example, an annotation may be added by clicking or selecting a point in the 3D mesh and inserting a desired 3D shape, optionally with a label. In other embodiments, an annotation may be added by importing one or more labels or layers that may be draped on the 3D mesh terrain. The imported labels or layers may be, for example, imported KML or GeoJSON data from one or more data sources 106. In some embodiments, imported data that represents 3D content may be parsed to create additional 3D meshes to add to the 3D mesh of the map at the correct coordinates. FIG. 7 illustrates an overlay tool 710 that may allow a user to add a marker or a label to the 3D mesh. Screen 700 illustrates a 3D mesh 702 that includes an added marker 722 to the 3D mesh. In addition, different labels or layers may be exported by selecting different interactive elements in the GUI, such as for roads 712 or buildings 714.

Mesh Export

FIG. 7 also illustrates a mesh export functionality of the Tile server 100. In some embodiments, the 3D mesh can be exported (with/without textures, and with/without annotations) for use in one or more external applications. For example, the 3D mesh may be exported as a GLTP, OBJ, Satellite, or other type of file containing 3D data. To ensure the mesh is adequately optimized, the vertex and triangle count, as well as total file size may optionally be displayed. FIG. 7 illustrates an export tool 716 that specifies one or more potential export file options. Element 718 also allows a user to select one or more areas on the 3D mesh 702.

Automations

In some embodiments, to assist with developer workflows, the application may express or exposes queryable endpoints to retrieve a mesh for given geographical coordinates, as well as a textures—corresponding to all the features described above available through the Graphical User Interface. Additionally, depth maps for elevation may also be queryable to allow for mesh creation in other tools.

Figure 8:
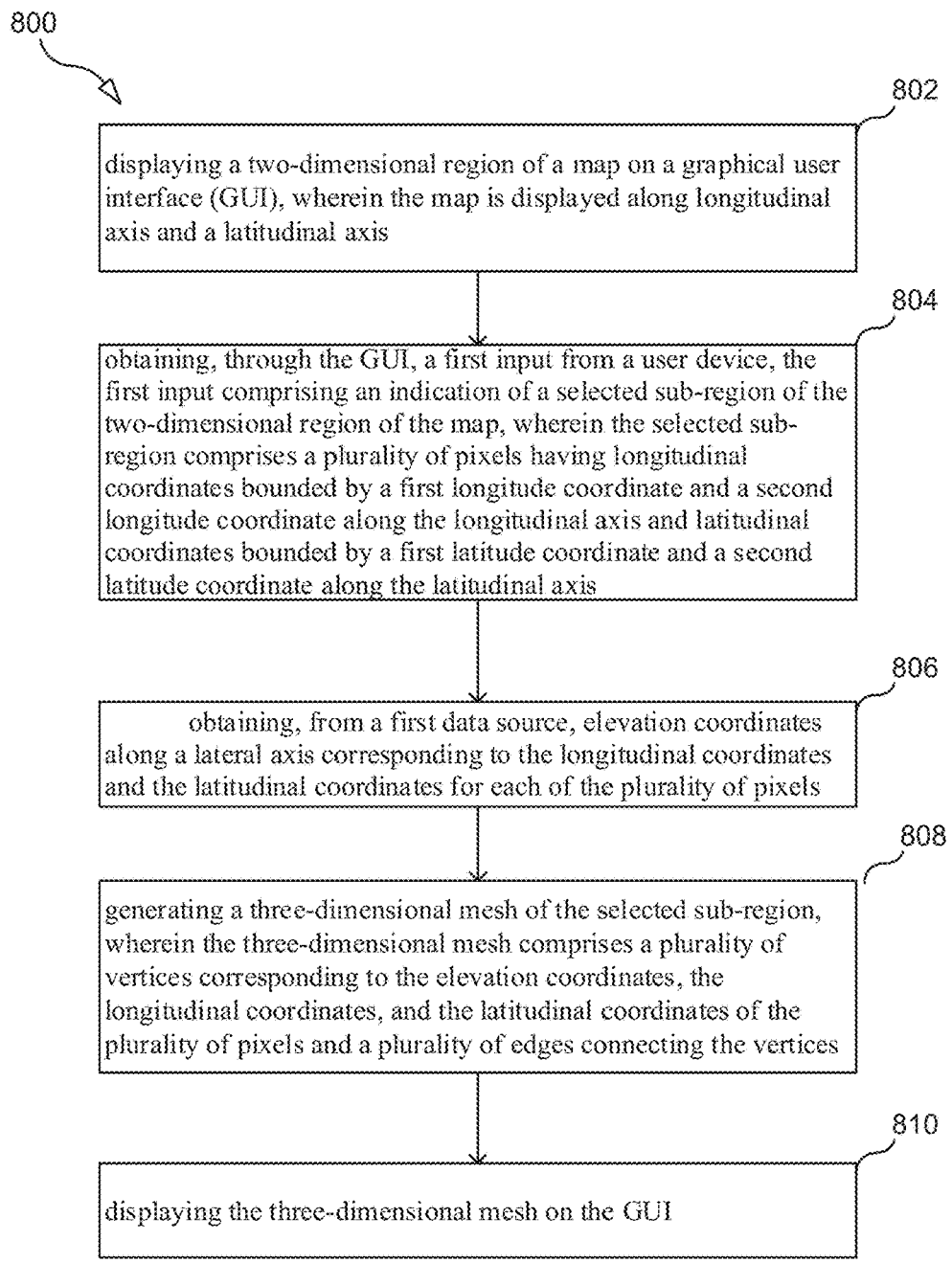
FIG. 8 is a method, according to some embodiments.

FIG. 8 illustrates a method, according to some embodiments. In some embodiments, method 800 is a computer-implemented method for generating a three-dimensional map. The method may be performed by Tile server 100.

At step 802, the method includes displaying a two-dimensional region of a map on a graphical user interface (GUI), wherein the map is displayed along longitudinal axis and a latitudinal axis. For example, FIG. 2 discussed above illustrates an example GUI screen illustrating a two-dimensional region of a map.

At step 804, the method includes obtaining, through the GUI, a first input from a user device, the first input comprising an indication of a selected sub-region of the two-dimensional region of the map, wherein the selected sub-region comprises a plurality of pixels having longitudinal coordinates bounded by a first longitude coordinate and a second longitude coordinate along the longitudinal axis and latitudinal coordinates bounded by a first latitude coordinate and a second latitude coordinate along the latitudinal axis. For example, FIG. 2 discussed above illustrates an example GUI screen that allows a user to select a section, or sub region, of the displayed map bounded by longitudinal and latitudinal coordinate ranges.

At step 806, the method includes obtaining, from a first data source, elevation coordinates along a lateral axis corresponding to the longitudinal coordinates and the latitudinal coordinates for each of the plurality of pixels.

At step 810, the method includes generating a three-dimensional mesh of the selected sub-region, wherein the three-dimensional mesh comprises a plurality of vertices corresponding to the elevation coordinates, the longitudinal coordinates, and the latitudinal coordinates of the plurality of pixels and a plurality of edges connecting the vertices.

At step 812, the method includes displaying the three-dimensional mesh on the GUI. Examples of a 3D mesh on the GUI are illustrates in FIGS. 3-7, discussed above.

Figure 9:
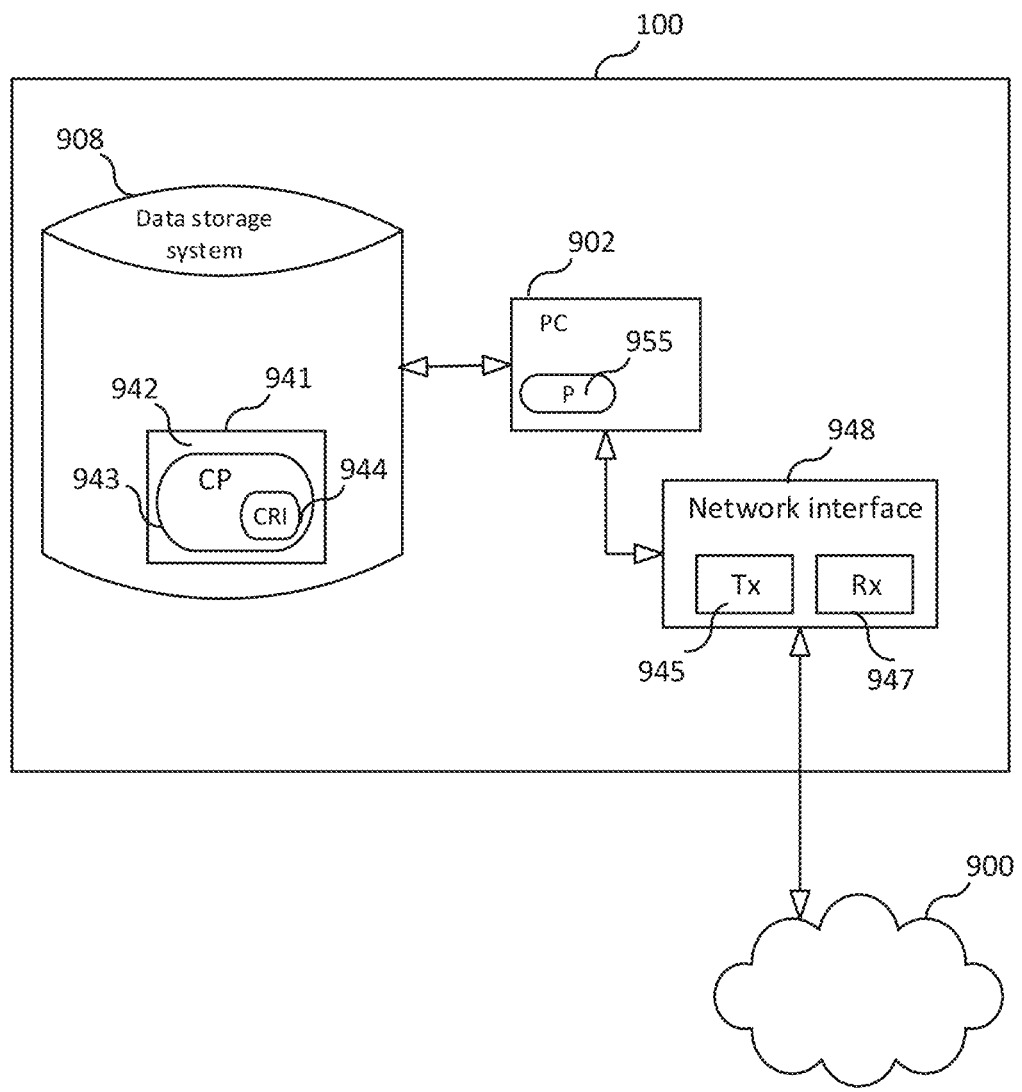
FIG. 9 is a block diagram illustrating a system, according to some embodiments.

FIG. 9 is a block diagram illustrating system 100 (e.g., Tile system 101), according to some embodiments. As shown in FIG. 9, the system may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling the system to transmit data to and receive data from other devices connected to a network 900 (e.g., an Internet Protocol (IP) network such as the Internet) to which network interface 900 is connected; and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes the system to perform steps described herein (e.g., steps described herein with reference to the flow charts). In other embodiments, the system may be configured to perform steps described herein without the need for code. That is, for example, PC 902 may consist merely of one or more ASICs. Hence, the features of the embodiments described herein may be implemented in hardware and/or software.

The following are certain enumerated embodiments further illustrating various aspects the disclosed subject matter.

A1. A computer-implemented method for generating a three-dimensional map, the method comprising:

displaying a two-dimensional region of a map on a graphical user interface (GUI), wherein the map is displayed along longitudinal axis and a latitudinal axis;

obtaining, through the GUI, a first input from a user device, the first input comprising an indication of a selected sub-region of the two-dimensional region of the map, wherein the selected sub-region comprises a plurality of pixels having longitudinal coordinates bounded by a first longitude coordinate and a second longitude coordinate along the longitudinal axis and latitudinal coordinates bounded by a first latitude coordinate and a second latitude coordinate along the latitudinal axis;

obtaining, from a first data source, elevation coordinates along a lateral axis corresponding to the longitudinal coordinates and the latitudinal coordinates for each of the plurality of pixels;

generating a three-dimensional mesh of the selected sub-region, wherein the three-dimensional mesh comprises a plurality of vertices corresponding to the elevation coordinates, the longitudinal coordinates, and the latitudinal coordinates of the plurality of pixels and a plurality of edges connecting the vertices; and displaying the three-dimensional mesh on the GUI.

A2. A method according to item A1, further comprising:

obtaining, through the GUI, a second input from the user device, the second input comprising an indication of a file format;

formatting the three-dimensional mesh according to the file format; and transmitting the formatted three-dimensional mesh to the user device.

A3. A method according to item A1, further comprising:

obtaining, through the GUI, a third input from the user device, the third input comprising an indication to simplify the three-dimensional mesh;

A4. A method according to item A3, wherein the third input corresponds to a threshold, the method further comprising:

identifying a first vertex in the three-dimensional mesh having a first elevation coordinate and a second vertex in the three-dimensional mesh having a second elevation coordinate;

determining that a difference between the first elevation coordinate and the second elevation coordinate is less than the threshold; and updating the first vertex and the second vertex to have the same elevation coordinate in the three-dimensional mesh.

A5. A method according to item A1, further comprising:

obtaining, through the GUI, a fourth input from the user device, the fourth input comprising an indication to add side walls to the three-dimensional mesh;

generating a first mesh along a first edge of the three-dimensional mesh having a lower boundary at a predetermined elevation coordinate, wherein the first edge corresponds to a first set of pixels having the first longitudinal coordinate bounded by the first latitudinal coordinate and the second latitudinal coordinate;

generating a second mesh along a second edge of the three-dimensional mesh having a lower boundary at the predetermined elevation coordinate, wherein the second edge corresponds to a second set of pixels having the second longitudinal coordinate bounded by the first latitudinal coordinate and the second latitudinal coordinate;

generating a third mesh along a third edge of the three-dimensional mesh having a lower boundary at the predetermined elevation coordinate, wherein the third edge corresponds to a third set of pixels having the first latitudinal coordinate bounded by the first longitudinal coordinate and the second longitudinal coordinate;

generating a fourth mesh along a fourth edge of the three-dimensional mesh having a lower boundary at the predetermined elevation coordinate, wherein the fourth edge corresponds to a fourth set of pixels having the second latitudinal coordinate bounded by the first longitudinal coordinate and the second longitudinal coordinate; and appending the first, second, third, and fourth meshes to the respective first, second, third, and fourth edges of the three-dimensional mesh.

A6. A method according to item A1, further comprising:

obtaining a fifth input from the user device, the fifth input comprising an indication of a selection of the first data source from a plurality of data sources.

A7. A method according to item A1, further comprising:

obtaining a sixth input from the user device, the sixth input comprising an indication of a selected location on the three-dimensional mesh and an annotation; and, appending the annotation to the three-dimensional mesh at the selected location.

A8. A method according to item A1, further comprising:

obtaining a seventh input from the user device, the seventh input comprising an indication of a texture; and obtaining, from a second data source, a texture corresponding to a terrain of the selected sub-region.

A9. A method according to item A1, wherein the GUI is displayed in a web-browser.

A10. A method according to item A10, wherein the three-dimensional mesh is a three.js three-dimensional model.

B1. A device adapted to perform any one of the methods in items A1-A10.

C1. A computer program comprising instructions which when executed by processing circuity of a device causes the device to perform the method of any one of items A1-A10.

While various embodiments of the present disclosure are described herein, it should be understood that they have been presented by way of example only, and not limitation. Thus, the breadth and scope of the present disclosure should not be limited by any of the above-described embodiments. Generally, all terms used herein are to be interpreted according to their ordinary meaning in the relevant technical field, unless a different meaning is clearly given and/or is implied from the context in which it is used. All references to a/an/the article, element, apparatus, component, layer, means, step, etc. are to be interpreted openly as referring to at least one instance of the article, element, apparatus, component, layer, means, step, etc., unless explicitly stated otherwise. Any combination of the above-described elements in all possible variations thereof is encompassed by the disclosure unless otherwise indicated herein or otherwise clearly contradicted by context.

The invention claimed is:

1. A computer-implemented method for generating a three-dimensional map, the method comprising:

displaying a two-dimensional region of a map on a graphical user interface (GUI), wherein the two-dimensional region of the map is displayed along a longitudinal axis and a latitudinal axis;

obtaining, through the GUI, a first input from a user device, the first input comprising an indication of a selected sub-region of the two-dimensional region of the map, wherein the selected sub-region comprises a plurality of pixels having longitudinal coordinates bounded by a first longitude coordinate and a second longitude coordinate along the longitudinal axis and latitudinal coordinates bounded by a first latitude coordinate and a second latitude coordinate along the latitudinal axis;

obtaining, from a first data source, elevation coordinates along a lateral axis corresponding to the longitudinal coordinates and the latitudinal coordinates for each of the plurality of pixels;

generating a three-dimensional mesh of the selected sub-region, wherein the three-dimensional mesh comprises a plurality of vertices corresponding to the elevation coordinates, the longitudinal coordinates, and the latitudinal coordinates of the plurality of pixels and a plurality of edges connecting the vertices;

generating a first mesh along a first edge of the three-dimensional mesh having a boundary at a predetermined elevation coordinate, wherein the first edge corresponds to a first set of pixels having the first longitudinal coordinate bounded by the first latitudinal coordinate and the second latitudinal coordinate;

generating a second mesh along a second edge of the three-dimensional mesh having a boundary at the predetermined elevation coordinate, wherein the second edge corresponds to a second set of pixels having the second longitudinal coordinate bounded by the first latitudinal coordinate and the second latitudinal coordinate; and displaying the three-dimensional mesh on the GUI.

2. The method of claim 1, further comprising:
obtaining, through the GUI, a second input from the user device, the second input comprising an indication of a file format;
formatting the three-dimensional mesh according to the file format; and
transmitting the formatted three-dimensional mesh to the user device.

3. The method of claim 1, further comprising:
obtaining, through the GUI, a third input from the user device, the third input comprising an indication to simplify the three-dimensional mesh.

4. The method of claim 3, wherein the third input corresponds to a threshold, the method further comprising:
identifying a first vertex in the three-dimensional mesh having a first elevation coordinate and a second vertex in the three-dimensional mesh having a second elevation coordinate;
determining that a difference between the first elevation coordinate and the second elevation coordinate is less than the threshold; and
updating the first vertex and the second vertex to have the same elevation coordinate in the three-dimensional mesh.

5. The method of claim 1, further comprising:
obtaining, through the GUI, a fourth input from the user device, the fourth input comprising an indication to add side walls to the three-dimensional mesh;
generating a third mesh along a third edge of the three-dimensional mesh having a boundary at the predetermined elevation coordinate, wherein the third edge corresponds to a third set of pixels having the first latitudinal coordinate bounded by the first longitudinal coordinate and the second longitudinal coordinate;

generating a fourth mesh along a fourth edge of the three-dimensional mesh having a boundary at the predetermined elevation coordinate, wherein the fourth edge corresponds to a fourth set of pixels having the second latitudinal coordinate bounded by the first longitudinal coordinate and the second longitudinal coordinate; and appending the first, second, third, and fourth meshes to the respective first, second, third, and fourth edges of the three-dimensional mesh.

6. The method of claim 1, further comprising:
obtaining a fifth input from the user device, the fifth input comprising an indication of a selection of the first data source from a plurality of data sources.

7. The method of claim 1, further comprising:
obtaining a sixth input from the user device, the sixth input comprising an indication of a selected location on the three-dimensional mesh and an annotation; and,
appending the annotation to the three-dimensional mesh at the selected location.

8. The method of claim 1, further comprising:
obtaining a seventh input from the user device, the seventh input comprising an indication of a texture; and
obtaining, from a second data source, a texture corresponding to a terrain of the selected sub-region.

9. The method of claim 1, wherein the GUI is displayed in a web-browser.

10. The method of claim 9, wherein the three-dimensional mesh is a three.js three-dimensional model.

11. A non-transitory computer readable medium storing instructions configured to cause a device to:
display a two-dimensional region of a map on a graphical user interface (GUI), wherein the two-dimensional region of the map is displayed along a longitudinal axis and a latitudinal axis;

obtain, through the GUI, a first input from a user device, the first input comprising an indication of a selected sub-region of the two-dimensional region of the map, wherein the selected sub-region comprises a plurality of pixels having longitudinal coordinates bounded by a first longitude coordinate and a second longitude coordinate along the longitudinal axis and latitudinal coordinates bounded by a first latitude coordinate and a second latitude coordinate along the latitudinal axis;

obtain, from a first data source, elevation coordinates along a lateral axis corresponding to the longitudinal coordinates and the latitudinal coordinates for each of the plurality of pixels;

generate a three-dimensional mesh of the selected sub-region, wherein the three-dimensional mesh comprises a plurality of vertices corresponding to the elevation coordinates, the longitudinal coordinates, and the latitudinal coordinates of the plurality of pixels and a plurality of edges connecting the vertices;

generate a first mesh along a first edge of the three-dimensional mesh having a boundary at a predetermined elevation coordinate, wherein the first edge corresponds to a first set of pixels having the first longitudinal coordinate bounded by the first latitudinal coordinate and the second latitudinal coordinate;

generate a second mesh along a second edge of the three-dimensional mesh having a boundary at the predetermined elevation coordinate, wherein the second edge corresponds to a second set of pixels having the second longitudinal coordinate bounded by the first latitudinal coordinate and the second latitudinal coordinate; and display the three-dimensional mesh on the GUI.

12. A system for generating a three-dimensional map, the system comprising:
- a display device configured to display a graphical user interface (GUI);
- a processor; and
- a non-transitory computer readable memory coupled to the processor, wherein the system is configured to:
- display a two-dimensional region of a map on the GUI, wherein the two-dimensional region of the map is displayed along a longitudinal axis and a latitudinal axis;
- obtain, through the GUI, a first input from a user device, the first input comprising an indication of a selected sub-region of the two-dimensional region of the map, wherein the selected sub-region comprises a plurality of pixels having longitudinal coordinates bounded by a first longitude coordinate and a second longitude coordinate along the longitudinal axis and latitudinal coordinates bounded by a first latitude coordinate and a second latitude coordinate along the latitudinal axis;
- obtain, from a first data source, elevation coordinates along a lateral axis corresponding to the longitudinal coordinates and the latitudinal coordinates for each of the plurality of pixels;
- generate a three-dimensional mesh of the selected sub-region, wherein the three-dimensional mesh comprises a plurality of vertices corresponding to the elevation coordinates, the longitudinal coordinates, and the latitudinal coordinates of the plurality of pixels and a plurality of edges connecting the vertices;
- generate a first mesh along a first edge of the three-dimensional mesh having a boundary at a predetermined elevation coordinate, wherein the first edge corresponds to a first set of pixels having the first longitudinal coordinate bounded by the first latitudinal coordinate and the second latitudinal coordinate;
- generate a second mesh along a second edge of the three-dimensional mesh having a boundary at the predetermined elevation coordinate, wherein the second edge corresponds to a second set of pixels having the second longitudinal coordinate bounded by the first latitudinal coordinate and the second latitudinal coordinate; and
- display the three-dimensional mesh on the GUI.

13. The system of claim 12, wherein the system is further configured to:
- obtain, through the GUI, a second input from the user device, the second input comprising an indication of a file format;
- format the three-dimensional mesh according to the file format; and
- transmit the formatted three-dimensional mesh to the user device.

14. The system of claim 12, wherein the system is further configured to:
- obtain, through the GUI, a third input from the user device, the third input comprising an indication to simplify the three-dimensional mesh.

15. The system of claim 14, wherein the third input corresponds to a threshold, and the system is further configured to:
- identify a first vertex in the three-dimensional mesh having a first elevation coordinate and a second vertex in the three-dimensional mesh having a second elevation coordinate;
- determine that a difference between the first elevation coordinate and the second elevation coordinate is less than the threshold; and
- update the first vertex and the second vertex to have the same elevation coordinate in the three-dimensional mesh.

16. The system of claim 12, wherein the system is further configured to:
- obtain, through the GUI, a fourth input from the user device, the fourth input comprising an indication to add side walls to the three-dimensional mesh;
- generate a third mesh along a third edge of the three-dimensional mesh having a lower boundary at the predetermined elevation coordinate, wherein the third edge corresponds to a third set of pixels having the first latitudinal coordinate bounded by the first longitudinal coordinate and the second longitudinal coordinate;
- generate a fourth mesh along a fourth edge of the three-dimensional mesh having a lower boundary at the predetermined elevation coordinate, wherein the fourth edge corresponds to a fourth set of pixels having the second latitudinal coordinate bounded by the first longitudinal coordinate and the second longitudinal coordinate; and
- append the first, second, third, and fourth meshes to the respective first, second, third, and fourth edges of the three-dimensional mesh.

17. The system of claim 12, wherein the system is further configured to:
- obtain a fifth input from the user device, the fifth input comprising an indication of a selection of the first data source from a plurality of data sources.

18. The system of claim 12, wherein the system is further configured to:
- obtain a sixth input from the user device, the sixth input comprising an indication of a selected location on the three-dimensional mesh and an annotation; and,
- append the annotation to the three-dimensional mesh at the selected location.

19. The system of claim 12, wherein the system is further configured to:
- obtain a seventh input from the user device, the seventh input comprising an indication of a texture; and
- obtain, from a second data source, a texture corresponding to a terrain of the selected sub-region.

20. The system of claim 12, wherein the GUI is displayed in a web-browser.

* * * * *